(12) United States Patent
Welker (10) Patent No.: US 11,867,343 B2
(45) Date of Patent: Jan. 9, 2024

(54) COATED PIPE AND PIPE COMBINATION

(71) Applicant: TDC INTERNATIONAL AG, Lucerne (CH)

(72) Inventor: Daniel Welker, Lucerne (CH)

(73) Assignee: TDC INTERNATIONAL AG, Lucerne (CH)

( * ) Notice: Subject to any disclaimer, the term of this patent is extended or adjusted under 35 U.S.C. 154(b) by 0 days.

(21) Appl. No.: 17/967,531

(22) Filed: Oct. 17, 2022

(65) Prior Publication Data

US 2023/0052636 A1 Feb. 16, 2023

Related U.S. Application Data

(63) Continuation of application No. 17/255,038, filed as application No. PCT/EP2019/067449 on Jun. 28, 2019, now Pat. No. 11,473,716.

(30) Foreign Application Priority Data

Jun. 29, 2018 (DE) .......................... 102018115846.7

(51) Int. Cl.
| | | |
|---|---|---|
| *F16L 9/04* | (2006.01) | |
| *F16L 58/10* | (2006.01) | |
| *F16L 47/02* | (2006.01) | |
| *F16L 58/18* | (2006.01) | |

(52) U.S. Cl.
CPC ........... *F16L 58/1063* (2013.01); *F16L 9/042* (2013.01); *F16L 47/02* (2013.01); *F16L 58/181* (2013.01)

(58) Field of Classification Search
CPC .......... F16L 58/1063; F16L 9/042; F16L 9/04

USPC ........ 138/143, 137, 140, 141, 145, 146, 172
See application file for complete search history.

(56) References Cited

U.S. PATENT DOCUMENTS

| | | | |
|---|---|---|---|
| 4,173,670 | A | 11/1979 | VanAuken |
| 4,377,458 | A | 3/1983 | Watanabe |
| 6,412,521 | B1 | 7/2002 | Sausner et al. |
| 10,232,581 | B1 | 3/2019 | Huang |
| 11,473,716 | B2 | 10/2022 | Welker |
| 2001/0044022 | A1 | 11/2001 | Danner |
| 2011/0003165 | A1 | 1/2011 | Weber |

(Continued)

FOREIGN PATENT DOCUMENTS

| | | |
|---|---|---|
| DE | 2042720 | 3/1972 |
| DE | 102011113554 | 6/2012 |
| EP | 0309597 | 4/1989 |

(Continued)

OTHER PUBLICATIONS

Official Action for Saudi Arabia Patent Application No. 520420901, dated Jan. 23, 2023, 8 pages.

(Continued)

*Primary Examiner* — Patrick F Brinson
(74) *Attorney, Agent, or Firm* — Sheridan Ross P.C.

(57) ABSTRACT

The invention relates to a pipe having a thermoplastic casing surface and a glass-fibre-reinforced thermo-setting coating surrounding the thermoplastic casing surface. The thermo-setting coating is formed from multiple layers of glass-fibre matting or glass-fibre fabric, or a combination of the two, wherein the layers are applied to the thermoplastic casing surface in a wet-on-wet method using a vinylester, polyester or epoxy resin. According to the invention, an outer layer of the thermo-setting coating is formed from cross-wound glass-fibre fleece or glass-fibre fabric.

18 Claims, 6 Drawing Sheets

(56) References Cited

U.S. PATENT DOCUMENTS

2012/0068497 A1    3/2012   Kia et al.
2013/0146172 A1    6/2013   Poirette et al.

FOREIGN PATENT DOCUMENTS

| EP | 2354613 | 8/2011 |
| WO | WO 01/05580 | 1/2001 |
| WO | WO 02/04201 | 1/2002 |
| WO | WO 2017/181197 | 10/2017 |

OTHER PUBLICATIONS

English Translation of International Search Report for International (PCT) Patent Application No. PCT/EP2019/067449, dated Sep. 23, 2019, 2 pages.
International Search Report and Written Opinion for International (PCT) Patent Application No. PCT/EP2019/067449, dated Sep. 23, 2019, 9 pages.
Official Action for U.S. Appl. No. 17/255,038, dated Jan. 27, 2022, 8 pages.
Notice of Allowance for U.S. Appl. No. 17/255,038, dated Jun. 13, 2022, 5 pages.

Fig. 5

COATED PIPE AND PIPE COMBINATION

CROSS REFERENCE TO RELATED APPLICATIONS

This application is a Continuation patent application of U.S. patent application Ser. No. 17/255,038, filed Dec. 22, 2020, which issued as U.S. Pat. No. 11,473,716 on Oct. 18, 2022, which is a national stage application under 35 U.S.C. 371 and claims the benefit of PCT Application No. PCT/EP2019/067449 having an international filing date of Jun. 28, 2019, which designated the United States, which PCT application claimed the benefit of German Patent Application No. 102018115846.7 filed Jun. 29, 2018, the entire disclosures of each of which are incorporated herein by reference in their entirety.

The invention relates to a metal pipe having a thermoplastic casing surface and a fibre-reinforced thermo-setting coating surrounding the thermoplastic casing surface. Another aspect is a pipe combination of multiple pipes having a thermoplastic casing surface.

It is known to provide buried steel pipes for the transport of liquid or gaseous media with a relatively thin coating of plastic, preferably polypropylene polyethylene, fusion-bonded epoxy (FBE) or polyurethane, for example, in order to prevent corrosion of the metal pipe material. On the one hand, such layers of polypropylene, polyethylene, or polyurethane ensure an excellent corrosion protection, as the ground moisture cannot come into contact with the metal pipe material. However, on the other hand, they have the disadvantage of having relatively low mechanical strength. In order to protect the polypropylene, polyethylene, or polyurethane coating from undesired mechanical abrasion, it is known to additionally cover the pipe with a fibre cement casing. However, the mechanical protective effect of the fibre cement is relatively low, since the fibre cement itself has only a low inherent strength and, in addition, because of the low adhesive power of polypropylene, polyethylene, FBE, or polyurethane, it also adheres poorly to the plastic coating.

For this reason, mechanical damage to the thin and relatively soft polypropylene, polyethylene, or polyurethane layer often occurs during the essentially trenchless pipe-laying process, for example when drilling horizontally, during pipe jacking using a "culvert", so that the corrosion protection for the metal pipe material is eliminated locally or at least unjustifiably limited.

The purpose of the invention is to improve known methods for the coating of pipes and pipe connections both in open and trenchless construction.

According to the invention, this task is solved by a metal pipe with a thermoplastic casing surface and a glass-fibre-reinforced thermo-setting coating surrounding the thermoplastic casing surface. The thermo-setting coating consists of multiple layers of glass-fibre-reinforced plastic (GfK), whereby the layers are made of glass-fibre-reinforced plastic, glass fibres in the form of rovings, UD fabrics, UD scrims, glass fibre mats or glass-fibre fabrics or a combination of these, and the layers are applied to the thermoplastic casing surface using a vinyl ester, polyester, or epoxy resin in a wet-on-wet method. According to the invention, at least one layer of the thermo-setting coating is formed by cross-wound textile glass rovings or glass fibre mats or glass-fibre fabric or a combination of these glasses. Cross-wound means that the glass fibres are applied to the pipe by winding, whereby one (glass) layer is applied in a first winding direction and a second (glass) layer is applied in the opposite direction to this winding direction, whereby the two glass layers do not cross.

Preferably at least the outermost layer of the thermo-setting coating—here referred to as the outer layer—is cross-wound. Such an outer layer offers the advantage that the pipe provided with the thermo-setting coating can be advanced in any direction. With known pipes there is typically one direction with a greater risk of damage to the thermo-setting coating than in the opposite direction.

Preferably, the glass fibres wound on the pipe are provided in the form of rovings, especially winding rovings, UD fabrics or UD scrims. UD fabrics are glass-fibre fabrics, which are essentially formed by unidirectional (UD) arranged glass-fibre rovings having only comparatively few fibres running transversely to the rovings. UD scrims are formed by unidirectionally (UD) arranged glass-fibre rovings, which are held together by holding threads running transversely to the rovings.

The thermoplastic casing surface is preferably applied directly to the metal pipe. The metal pipe is preferably a steel pipe. Alternatively, the pipe itself can also be a plastic pipe with its wall made of thermoplastic.

Furthermore, it is preferable that the thermo-setting coating has an almost continuously decreasing thickness at the longitudinal ends of the pipe over a length of approx. 100 mm, at most half a meter, whereby the thermo-setting coating is provided with a peel ply on its outside in its area of decreasing thickness. This measure contributes to the fact that the longitudinal ends of the pipes do not have to be sanded before the application of the thermo-setting coating on the construction side.

Furthermore, it is preferable if the layers of the fibre-reinforced thermo-setting coating formed by glass fibre mats or glass-fibre fabric—with the exception of the outer coatings—are formed by glass fibre webs that are wound around the pipe in such a way that the edges of each glass fibre web overlap by 2 to 5 cm. As a result, each layer of the thermo-setting coating is built up without gaps and is self-contained.

In accordance with a particularly preferred embodiment, the thermo-setting coating has one or two inner layers, each of which is made up of a glass-fibre mat or glass-fibre fabric with a grammage between 300 and 500 g/m$^2$, preferably around 450 g/m$^2$. The inner layer or inner layers are those layers of the thermo-setting coating which are closest to the thermoplastic casing surface.

Layers of wound rovings and axial glass fibres, in particular UD fabrics or UD scrims, are particularly preferred, i.e. layers of wound rovings and axial glass fibres are applied alternately. The required material proportions of reaction resin in relation to glass fibres can vary depending on the requirements. Preferably, about 600 g/m$^2$ winding rovings are applied as reinforcement in radial direction, and about 400 g/m$^2$ in axial pipe direction alternately. It is also possible to use cut glass fibres (cut roving) or solid fillers such as quartz sand between the individual glass layers. This reduces the raw material costs and hardly affects the mechanical properties.

In accordance with a further advantageous embodiment, multiple individual, locally limited thermo-setting coatings in the form of frames or skids are provided, which serve as spacers to a cladding pipe during installation of the pipe and thus protect the thermoplastic casing surface against mechanical loads.

Further preferred are combinations of a thermo-setting coating extending over the length of a pipe and shorter frames or skids.

The inner layer or inner layers are preferably formed of wound glass fibre strips less than 35 cm wide. For example, if the width of the glass fibre web is 30 cm and these are wound around the pipe with a 3 cm overlap, the resulting winding will have a pitch of 27 cm.

Further, it is preferred that the thermo-setting coating has at least one middle layer or two middle layers, each of which consists of a glass-fibre mat or glass-fibre fabric with a grammage between 800 g/m$^2$ and 1200 g/m$^2$, preferably with a grammage of about 1,000 g/m$^2$, e.g. 1,030 g/m$^2$. The middle layer or layers of the thermo-setting coating are located in the radial direction of the pipe between the at least one inner layer and the outer layer.

The at least one middle layer of the thermo-setting coating is preferably formed by a wound glass fibre web with a maximum width of 40 cm. With an overlap of about 5 cm this results in a pitch of 35 cm per winding.

The thermoplastic casing surface of the pipe is preferably made of polyethylene, polypropylene, fusion bonded epoxy (FBE), or polyurethane, with polyethylene being the most preferred material.

Further, it is preferred that the individual laminate layers also consist of endless radial winding rovings as well as a unidirectional textile glass fabric alternately.

The pipe preferably has a nominal diameter of between 100 and 2,500 mm and the thickness of the thermo-setting coating is preferably between 3 and 8 mm, particularly preferred around 5 mm.

Another aspect of the invention is a pipe combination consisting of multiple pipes of the above-mentioned type, in which, for example, 2 to 6 pipes are connected to each other in parallel with sleeves made of glass-fibre-reinforced plastic. The advantage of such a pipe combination is that multiple pipes can be laid or advanced at the same time, whereby the sleeves made of glass-fibre-reinforced plastic are closely connected with the thermo-setting coating of the pipes, so that the pipe combination is stable.

The required sleeve width as well as the sleeve distance in longitudinal direction are based on the project-related static calculations.

Preferably, the sleeves are spaced at a distance of 2 to 4 m from each other in the longitudinal direction of the pipe combination. The width of each sleeve is preferably between 20 and 50 cm, for example about 40 cm.

A pipe combination is preferably formed by 2 to 5 pipes, and particularly preferred by 3 to 4 pipes.

The centre lines of the pipes preferably have a distance from each other in the area of the sleeves that is greater than the outer diameter of the pipes. This means that the pipes of the pipe combination do not laterally directly connect to each other, but rather that the pipes of the pipe combination have a lateral distance from each other. This makes it easier to install the pipe combination along a slightly curved section.

The sleeves made of glass-fibre-reinforced plastic are preferably adhesively connected to the pipes. In this context, it is particularly advantageous if the sleeves have a resin matrix made of the same thermosetting plastic as the thermo-setting coating of the pipes, for example vinyl ester, polyester, or epoxy resin.

Another aspect of the invention relates to pipe joints which are made on site, i.e. when the pipes are installed, and which also have to be coated after the weld seam has been made. As a corrosion protection layer, it is preferred to spray a polyurethane layer over the entire area of the weld seam including the corrosion protection layer produced in the factory. After this layer has hardened, the surface is roughened, preferably by sandblasting, and a glass fibre reinforced thermo-setting coating is applied. This thermo-setting coating is formed by multiple layers of glass fibre mat or glass-fibre fabric or a combination of both, whereby the layers are applied to the polyurethane casing surface in a wet-on-wet method using a vinyl ester, polyester, or epoxy resin. The thickness of this thermo-setting coating on the construction side is preferably between 3 and 8 mm, particularly preferred about 5 mm.

Further features and properties as well as variants of pipes and pipe combinations according to the invention can be found in the following description of exemplary embodiments. Therefore, the following exemplary embodiments are used to explain the invention in more detail. Among the figures illustrating the exemplary embodiments, the individual figures show the following.

Figure 1:
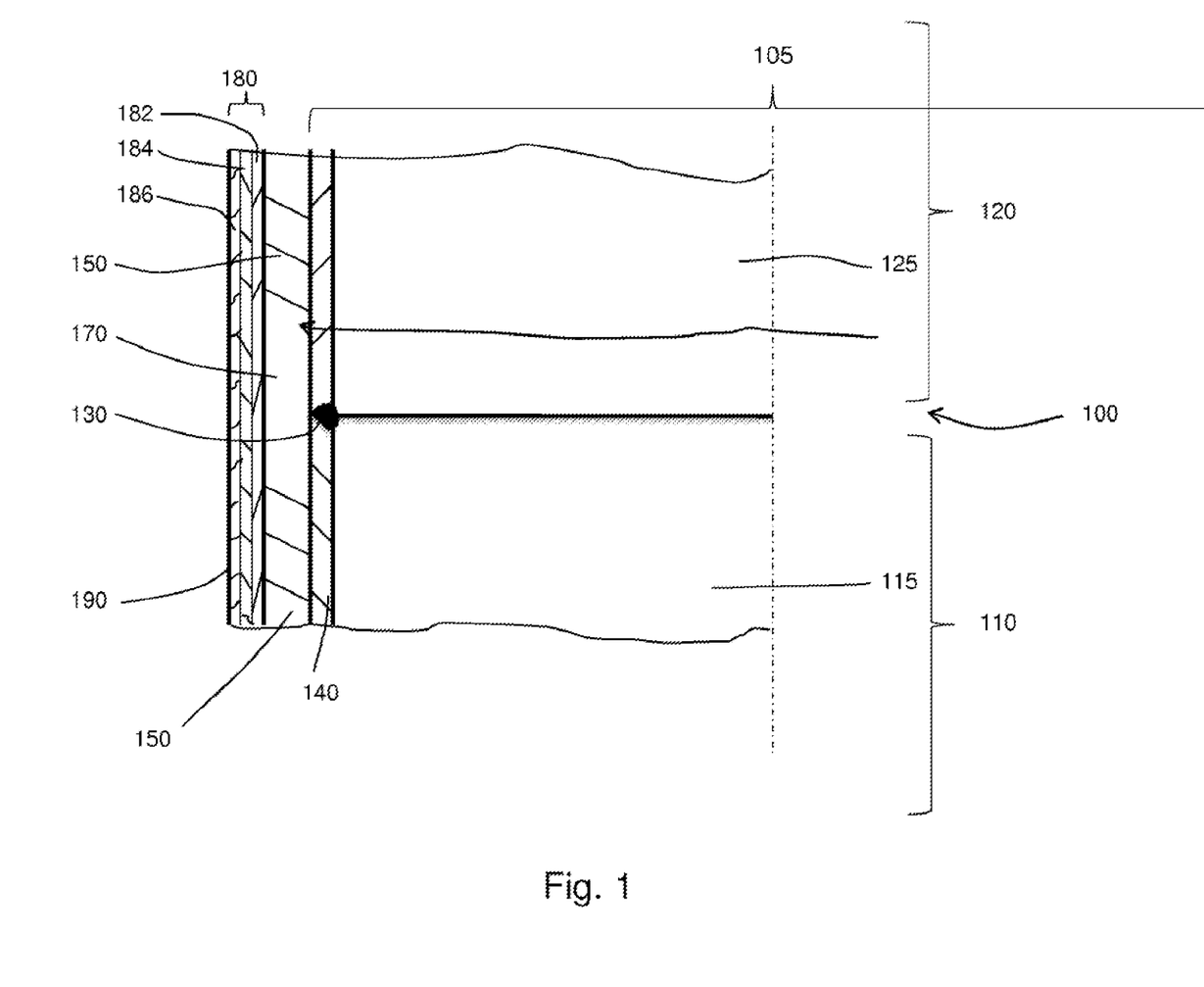
FIG. 1: is a longitudinal section through a pipe with a thermoplastic casing surface and the surrounding fibre-reinforced thermo-setting coating.

FIG. 1 is a sectional longitudinal section through a pipe 100, which is formed by an outlet pipe 105, for example made of metal, a thermoplastic casing surface 150 applied to it and a fibre-reinforced thermo-setting coating 180 surrounding the thermoplastic casing surface 150.

The outlet pipe 105 shown has a nominal diameter of 500 mm and is composed of multiple spiral-welded pipe sections 110 and 120 connected by a weld seam 130.

A wall 140 of the pipe 100 is made of steel and carries a thermoplastic casing surface 150 made of polyethylene (PE) which serves as a corrosion protection layer.

The thermoplastic casing surface 150 is interrupted in the area of the weld seam 130 and replaced by a polyethylene sleeve or repair tape 170 to bridge the interruption of the thermoplastic casing surface 150. In order to be able to weld pipe sections 110 and 120 together, the thermoplastic casing surface 150 is removed at the ends 115 and 125 of pipe sections 110 and 120 before they are welded together and replaced by the polyethylene sleeve or repair tape 170 after the welding process.

FIG. 1 shows that the thickness of the thermoplastic casing surface 150 corresponds approximately to the thickness of the fibre-reinforced thermo-setting coating 180 and is about 5 mm.

The thermo-setting coating 180 has one or two inner layers 182 and one or two middle layers 184 and one outer layer 186.

Each of these layers is made of glass fibre reinforced plastic, i.e. textile glass fibres wound around the pipe 100 and embedded in a resin matrix of vinyl ester resin, polyester resin or epoxy resin.

The fibre webs forming the inner layer 182 or the inner layers 182 and the fibre webs forming the middle layer 184 or the middle layers 184 are wound in the pipe 100 in such a way that the two edges of each fibre web overlap by about two to five centimetres.

The inner layer 182 or the inner layers 182 are formed in the exemplary embodiment by a glass fibre mat with a grammage of about 450 g/m2, while the middle layer 184 or the middle layers 184 are formed by a glass fibre mat with a grammage of about 1,030 g/m2.

The outer layer 186, unlike the inner layer 182 or inner layers 182 and the middle layer 184 or middle layers 184, is not applied with a uniform winding direction for each layer, but cross-wound, i.e. the outer layer is formed by two fibre webs wound in opposite directions and crossing each other so that, as a result, they are interwoven.

All layers 182, 184 and 186 are applied wet-on-wet to thermoplastic casing surface 150, i.e. a subsequent layer is applied in each case to the previous layer before the resin forming the resin matrix of the previous layer is cured. In this way, layers 182, 184 and 186 are closely connected together.

The glass content of thermo-setting coating 180 is at least 35 mass percent, i.e. the resin content is less than 65 percent.

Figure 2:
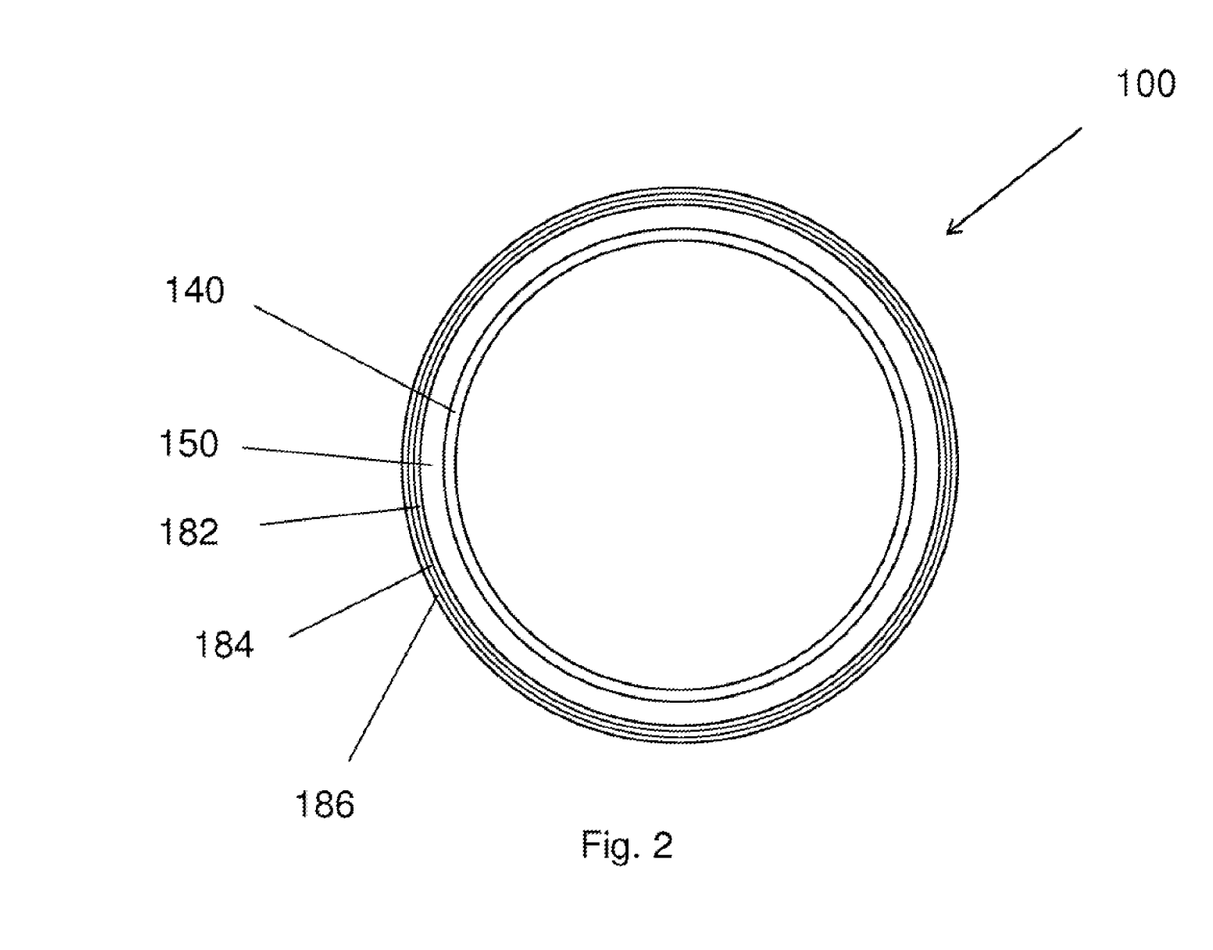
FIG. 2: shows an example of a cross-section through a pipe that is coated according to the invention.

FIG. 2 shows an example of a cross-section of a pipe 100 coated according to the invention.

Figure 3:
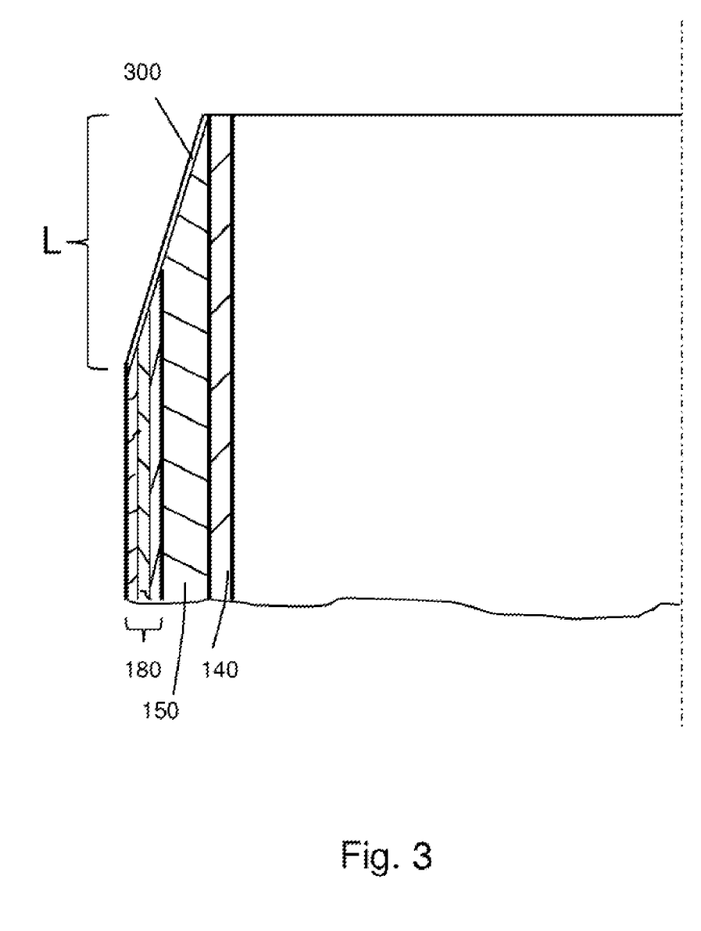
FIG. 3: shows a longitudinal end of a pipe with a thermo-setting coating with a thickness decreasing towards the longitudinal end.

FIG. 3 shows a longitudinal end of a pipe 100 with a thermo-setting coating 180, the thickness of which decreases over a length L towards the longitudinal end of the pipe 100. The thermo-setting coating 180 is provided with peel ply 300 on its outer side in its area L of decreasing thickness. Both measures—the decreasing thickness as well as the peel ply 300—contribute to the fact that the longitudinal ends of the pipes 100 can easily be joined together by welding and that after welding the pipes in the area of the weld seam a thermo-setting coating can easily be built up. The peel ply ensures that the original thermo-setting coating in the area of the pipe ends does not have to be sanded. The decreasing thickness of the original thermo-setting coating leads to an almost constant transition from the original thermo-setting coating to the local thermo-setting coating that is applied after welding the pipes in the area of the weld seam.

Figure 4:
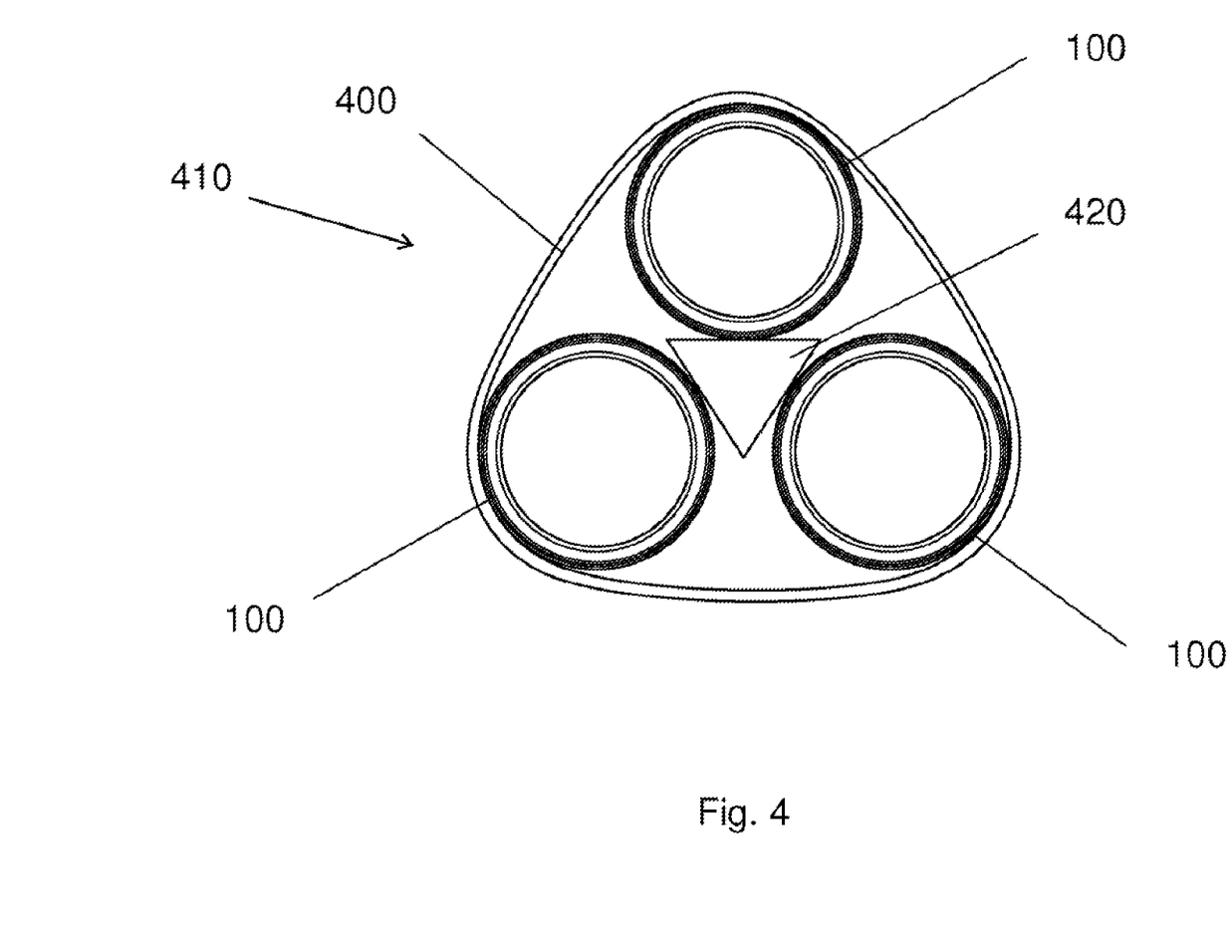
FIG. 4: shows a pipe combination of three pipes, which are connected by sleeves, in a partially cut front view.

FIG. 4 shows a pipe combination of three pipes 100, which are connected to each other with sleeves 400 made of glass fibre reinforced plastic to form the pipe combination 410.

The pipes 100 are spaced apart in the area of the sleeves 400 so that the pipes 100 of the pipe combination 410 do not laterally touch each other and do not directly connect to each other. This makes it easier to install the pipe combination 410 along a slightly curved section. To ensure this distance, spacers 420 are provided in the area of the sleeves 400, which keep the pipes 100 laterally at a distance from each other.

The glass-fibre-reinforced plastic sleeves 400 are adhesively connected to the pipes. The resin matrix of the sleeves is made of the same thermosetting plastic as the thermo-setting coating 180 of the pipes 100, for example vinyl ester or polyester resin.

The required sleeve width as well as the sleeve distance in longitudinal direction are based on the project-related static calculations.

Figure 5:
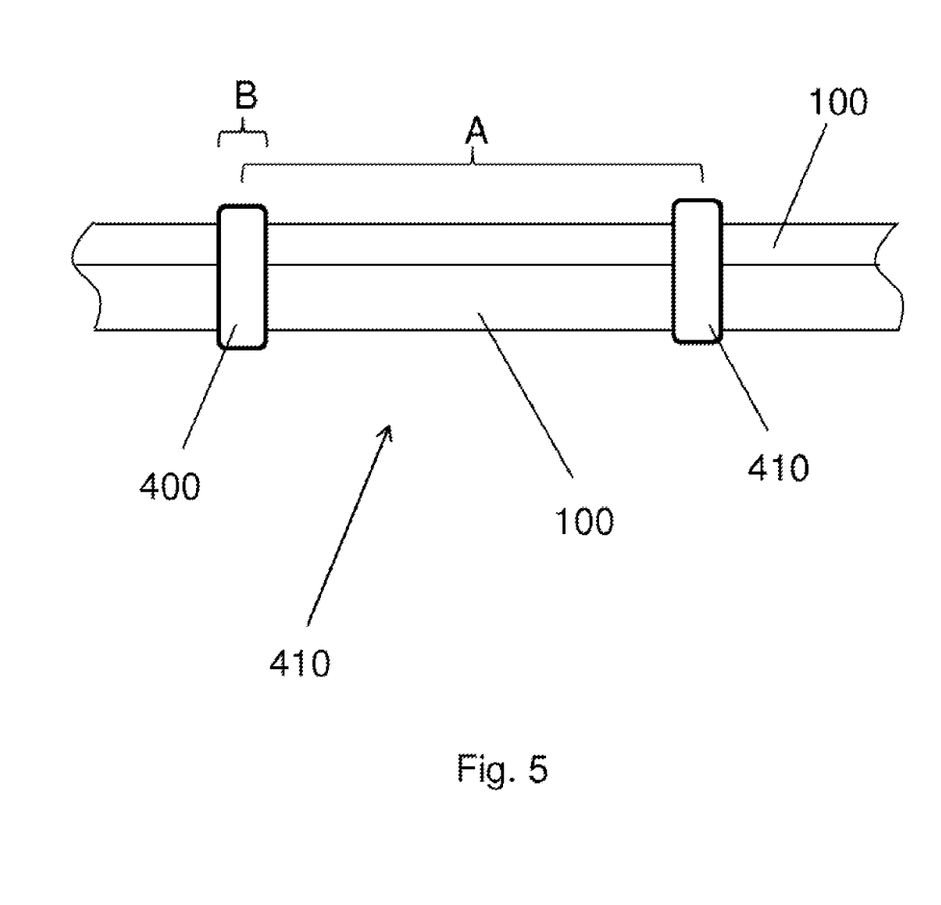
FIG. 5: shows the pipe combination from FIG. 4 in a side view.

As shown in FIG. 5, the sleeves 400 are spaced at a distance A of 2 to 4 m from each other in the longitudinal direction of the pipe 410. The width B of each sleeve 400 is preferred to amount to about 40 cm.

Instead of three pipes (as shown), a pipe combination can also be formed of two to six pipes. The advantage of such a pipe combination is that multiple pipes 100 can be installed or advanced at the same time, whereby the sleeves 400 made of glass-fibre-reinforced plastic are closely connected with the thermo-setting coating 180 of the pipes 100, so that the pipe combination is stable.

Figure 6:
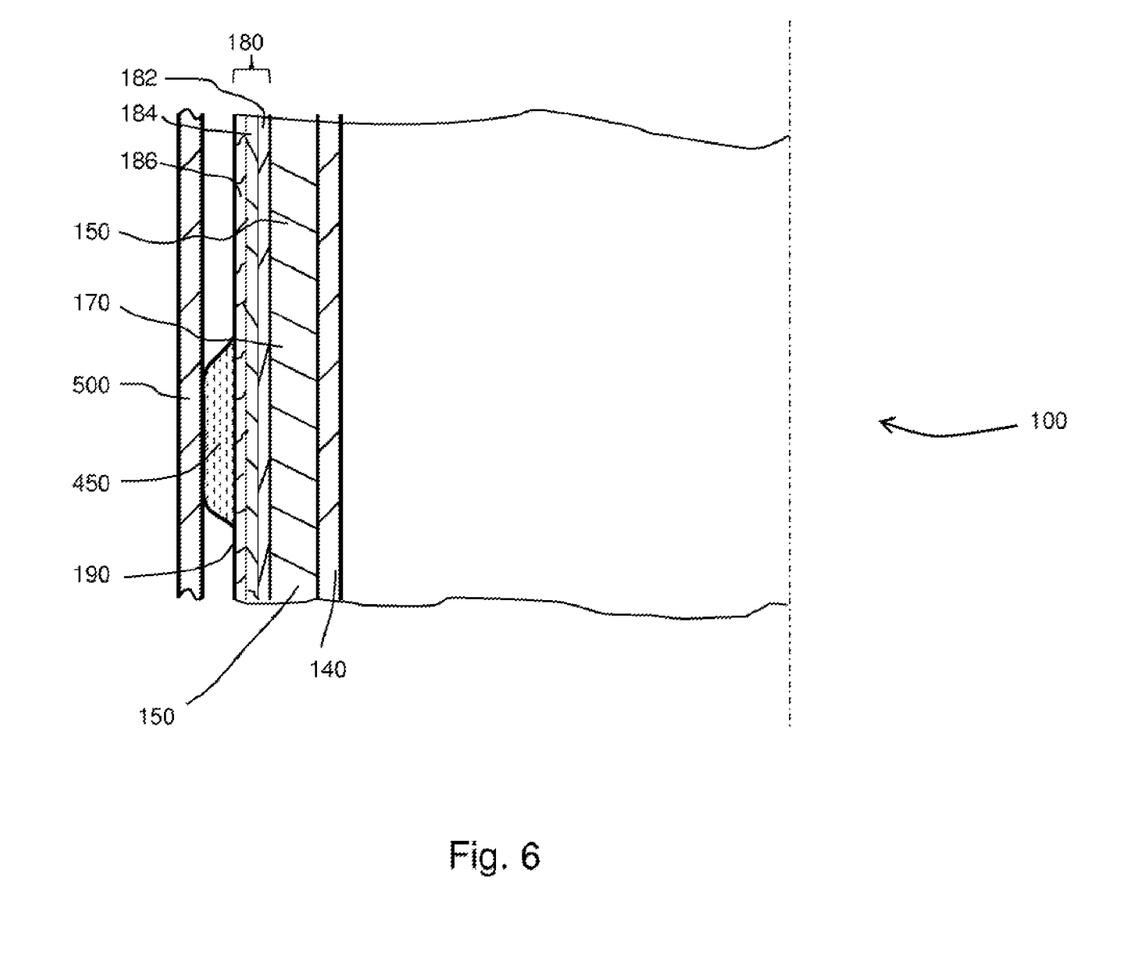
FIG. 6 shows a longitudinal section through a pipe section with a pipe with a thermoplastic casing surface and a fibre-reinforced thermo-setting coating surrounding the thermoplastic casing surface as well as a skid attached to it as a spacer to a cladding pipe.

FIG. 6 shows a longitudinal section through a pipe section with a pipe 100 having a thermoplastic casing surface 150 and a fibre-reinforced thermo-setting coating 180 surrounding the thermoplastic casing surface 150 and a skid 450 applied to it as a spacer to form a cladding pipe 500. Here, the cladding pipe 500 serves as an external protection into which the pipe 100 together with the thermoplastic casing surface 150, thermo-setting coating 180 and skid 450 applied to it is inserted. Preferably, multiple skids 450 with a longitudinal distance between them are provided.

The skids 450 are a feature that can be realised independently of a thermoset coating or in combination with any thermo-setting coating.

| List of reference signs | |
|---|---|
| 100 | Pipe |
| 105 | Metal outlet pipe |
| 110, 120 | Pipe section |
| 115, 125 | gitudinal end of a pipe |
| 130 | Weld seam |
| 140 | Wall |
| 150 | Thermoplastic casing surface |
| 170 | Repair tape |
| 180 | Thermo-setting coating |
| 182 | Inside layer of the thermo-setting coating |
| 184 | Middle layer of the thermo-setting coating |
| 186 | Outer layer of the thermo-setting coating |
| 300 | Peel ply |
| 400 | Sleeve |
| 410 | Pipe combination |
| 420 | Spacers |
| 450 | Skid |
| 500 | Cladding pipe |

What is claimed is:

1. A metal pipe, comprising:
a fusion-bonded epoxy (FBE) casing surface and a fibre-reinforced thermo-setting coating surrounding the fusion-bonded epoxy (FBE) casing surface, wherein the fibre-reinforced thermo-setting coating is formed from multiple layers of textile glass fibres which are applied to the fusion-bonded epoxy (FBE) casing surface in a wet-on-wet method using a vinyl ester, polyester, or epoxy resin, wherein individual layers of the fibre-reinforced thermo-setting coating are formed by cross-wound textile glass fibres.

2. The metal pipe according to claim 1, wherein the fusion-bonded epoxy (FBE) casing surface is applied to a steel pipe.

3. The metal pipe according to claim 1, wherein the fibre-reinforced thermo-setting coating is provided with peel ply on its outer side over a length of between approximately 100 mm and half a meter at the longitudinal ends of the metal pipe.

4. The metal pipe according to claim 1, wherein the layers of the fibre-reinforced thermo-setting coating formed by glass fibre mats or fabrics, with the exception of an outer layer, are formed by glass fibre webs which are wound around the metal pipe in such a way that edges of the respective glass fibre webs overlap by two to five centimeters.

5. The metal pipe according to claim 1, wherein the layers of the fibre-reinforced thermo-setting coating formed by glass fibre mats or fabrics having one inner layer or two inner layers are each formed by a glass fibre mat or fabric with a grammage between 300 and 500 g/m².

6. The metal pipe according to claim 5, wherein the inner layer or layers are formed by wound fiberglass webs having a width of less than 35 centimeters.

7. The metal pipe according to claim 5, wherein the grammage of the glass fibre mat or fabric is about 450 g/m².

8. The metal pipe according to claim 1, wherein the layers of the fibre-reinforced thermo-setting coating formed by glass fibre mats or fabrics having one middle layer or two middle layers, are each formed by a glass fibre mat or fabric with a grammage of between 800 and 1200 g/m², the middle layer or layers being located between, in the radial direction of the metal pipe, at least one inner layer and an outer layer of the fibre-reinforced thermo-setting coating.

9. The metal pipe according to claim 8, wherein the grammage of the glass fibre mat or fabric is about 1000 g/m².

10. The metal pipe according to claim 8, wherein the middle layer or the middle layers are formed by wound glass fibre webs with a maximum width of 40 cm.

11. The metal pipe according to claim 1, wherein the metal pipe has a nominal diameter between 100 and 2,500 millimeters and the thickness of the fibre-reinforced thermo-setting coating is between two and eight millimeters.

12. The metal pipe according to claim 11, wherein the thickness of the fibre-reinforced thermo-setting coating is about five millimeters.

13. A pipe combination having a plurality of pipes according to claim 1, wherein pipes are connected parallel to one another with sleeves of glass fibre reinforced plastic.

14. The pipe combination according to claim 13, wherein the pipe combination is formed by two to five pipes.

15. The pipe combination according to claim 14, wherein the pipe combination is formed by three to four pipes.

16. The pipe combination according to claim 13, wherein center lines of the pipes in the area of the sleeves have a distance from one another which is greater than outer diameters of the pipes.

17. The pipe combination according to claim 13, wherein the sleeves are adhesively connected to the pipes.

18. The pipe combination according to claim 13, wherein the glass fibre reinforced plastic of the sleeves has a resin matrix of the same thermosetting plastic as the fibre-reinforced thermo-setting coating of the pipes.

* * * * *